United States Patent
Hessing et al.

(10) Patent No.: US 6,687,611 B1
(45) Date of Patent: Feb. 3, 2004

(54) METHOD FOR CODING AND DECODING OBJECTS IN A ROAD TRAFFIC NETWORK

(75) Inventors: Bernd Hessing, Holle (DE); Cornelius Hahlweg, Hildesheim (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,857
(22) PCT Filed: Aug. 11, 2000
(86) PCT No.: PCT/DE00/02701
§ 371 (c)(1), (2), (4) Date: Feb. 28, 2002
(87) PCT Pub. No.: WO01/18769
PCT Pub. Date: Mar. 15, 2001

(30) Foreign Application Priority Data

Sep. 7, 1999 (DE) .......................... 199 42 524
Feb. 26, 2000 (DE) .......................... 100 09 149

(51) Int. Cl.$^7$ .............................................. G01C 21/00
(52) U.S. Cl. ....................................................... 701/208
(58) Field of Search ................................. 701/208, 209, 701/24, 25, 26; 342/357.09, 357.1, 357.13

(56) References Cited

U.S. PATENT DOCUMENTS

| 5,745,867 A | 4/1998 | Mills .......................... 701/207 |
| 6,249,740 B1 * | 6/2001 | Ito et al. ..................... 701/200 |

FOREIGN PATENT DOCUMENTS

| DE | 196 38 515 A | 4/1998 |
| EP | 0 725 502 A | 8/1996 |
| FR | 2 760 282 A | 9/1998 |

* cited by examiner

Primary Examiner—Yonel Beaulieu
(74) Attorney, Agent, or Firm—Michael J. Striker

(57) ABSTRACT

In a method for encoding objects in a traffic route network, to which information from one transmitter at a time to a receiver is transmitted, and for the encoding and decoding of which different databases, in particular digital maps of the traffic route network, can be used in the transmitter and the receiver, the objects are each provided with at least one coordinate chain, which is located at least in part on traffic routes that are also included in the database of the receiver, and which includes characteristic properties of parts of the traffic route network.

10 Claims, 3 Drawing Sheets

METHOD FOR CODING AND DECODING OBJECTS IN A ROAD TRAFFIC NETWORK

BACKGROUND OF THE INVENTION

The invention relates to a method for encoding objects in a traffic route network, to which information from one transmitter at a time to a receiver is transmitted, and for the encoding and decoding of which different databases, in particular digital maps of the traffic route network, can be used in the transmitter and the receiver.

For transmitting location-specific information, such as traffic reports, various methods have become known. In the TMC (Traffic Message Channel), for instance, a location is transmitted on the basis of a location code. Its geographic location and thus also the local association of the report are made possible only by a so-called location database in the receiver. For navigation purposes, digital road maps are used, in which the individual locations and other objects are identified by their geographic location and by their road connections. For transmitting arbitrary location-specific information to receivers which include a suitable database, encoding—also known as referencing—with the aid of a geographic context is therefore increasingly being done. This referencing goes beyond the indication of geographic data, because these data cannot preclude ambiguities (for instance a road under or over a bridge). There can also be differences among databases, for instance from different publishers.

From German Patent Disclosure DE 198 35 051.1, a device for encoding and decoding locations has been disclosed, in which the code includes a declaration and one encoded location each from all the coordinate parts, which location includes a plurality of pairs of coordinates; one pair of coordinates represents the coordinates, stored in memory at the transmitter, of the encoded location, and at least one further pair of coordinates represents at least one auxiliary point, while the declaration part includes at least the number of these pairs of coordinates contained in the coordinate part. With this device, however, it is not readily possible to encode and decode objects that are absent from the receiver database or are not present in it in identical form, especially deviating coordinates.

SUMMARY OF THE INVENTION

The object of the present invention is to encode and decode objects that are not present in a receiver database and/or if differences exist between the geographic indications in the databases.

In the encoding method according to the invention, this object is attained in that the objects are each provided with at least one coordinate chain, which is located at least in part on traffic routes that are also included in the database of the receiver and which includes characteristic properties of parts of the traffic route network. The characteristic properties can be prominent courses of the routes, in particular curves, and prominent sequences of intersections, forks and/or curves, or objects which are stored in memory, referenced identically, in each of the databases used.

The method of the invention can for instance be used to transmit information about objects which are not expected to be present in databases of the receivers. Such an object can for instance be a newly erected parking garage—that is, a point-like object—or together with an access road it can form a coordinate chain. A newly opened bypass road can for instance also be transmitted by the method of the invention and inserted into the database of a receiver. The information about the object can be a location indication per se, such as absolute or relative coordinates and names, other information such as texts, pictures, audio files, video files and internet addresses, or navigation attributes, such as travel directions (one-way streets), primary and secondary roads, and traffic limitations.

Transmitting information by the method of the invention can be done via arbitrary media, such as radio or an air interface (GSM, Bluetooth, WAP), or optical media. The information can also be exchanged via data carriers. Transmissions over various networks (ISDN, Internet) are also possible.

Examples of formats for transmitting the objects can be: the name of the object, coordinates of the first point, coordinates of the second point and so forth, or the name of the object, coordinates of the first point, coordinate differences from the second point, coordinate differences from the third point, and so forth. In the context of such formats, predefined curvy stretches can also be transmitted.

In performing the method of the invention, the coordinates located on flat ground (geographic coordinates, X/Y) are as a rule sufficient as coordinates. However, within the scope of the invention, it is also possible to include the altitude (Z) in the transmission and further processing.

In addition to the aforementioned use for transmitting objects that are not present, or not present in the same form, in the databases of the receivers, further possible uses also exist. For instance, information about locations to avoid, especially because of traffic jams, can be transmitted, or the fact that attributes of locations have changed, for instance so that the travel speeds in congested stretches can be adjusted before a route is calculated. Additional stretches, so-called emergency detours, can also be entered in the digital maps in the databases of the receivers. Attributes can also be added to the digital maps or changed in them, such as street names, service station hours of operation, and objects of interest to tourists or in other ways (POIs=Points of Interest).

The method of the invention can also be used to link two different digital maps to one another, if they have common objects suitable for comparison. In that case the transmitter and receiver need not be separate from one another. In the sense of the method of the invention, a navigation device can for instance serve as a transmitter; such a device has a relatively low-resolution digital map on a replaceable data carrier, while the receiver is the same navigation device, for instance with a more-detailed digital map.

A user of the navigation device is for instance driving toward a large city and is using a CD-ROM with a digital map, which contains only the most-important through roads through the large city. For navigating to a secondary road, the user can replace the CD-ROM with another that has a more-detailed map. If at the time of this manipulation the user's current location is not listed on this map, then a coordinate chain that contains the current location can be formed with parts of the through roads, and thus the current location and the route to the region shown on the more-detailed map can additionally be entered on that map.

Depending on the embodiment of the applicable part of the traffic route network, the coordinate chain required to achieve nonambiguity in the receiver can be embodied in various ways. To achieve the most optimal possible definition, particularly of as few pairs of coordinates as possible, in a refinement of the method of the invention it is proposed that an ascertained coordinate chain is compared with traffic routes of the database of the transmitter, and if ambiguities result the coordinate chain is varied and/or expanded by additional pairs of coordinates.

To avoid an unnecessary search for parts of the coordinate chain that are not present in the receiver database anyway, in another refinement it is provided that those parts of the at least one coordinate chain for which a match with the database of the receiver is to be expected are especially identified.

An advantageous method for decoding objects that are encoded by the method of the invention is that the coordinate chain that was received with the object is compared with the database of the receiver; that if there are similarities, the at least one coordinate chain is associated with the similar part of the traffic route network; and that in accordance with the geometric location of the associated part, the non-associated parts of the at least one coordinate chain are connected to the traffic routes of the receiver database.

Thus the receiver is also capable of decoding information about locations that are not present in its database and of outputting this information in a suitable form, for instance on a screen or by speech output.

Another use of the decoded information can be that the transmitted object and the parts, adjacent to the object, of the at least one coordinate chain that are not located in the traffic route network stored in memory in the database of the receiver, are entered into the database of the receiver, or entered in a further database.

To accomplish the comparison of the coordinate chain with the traffic routes stored in memory in the receiver database, it is preferably provided that for comparison, methods of pattern recognition (map matching) are employed.

BRIEF DESCRIPTION OF THE DRAWINGS

Exemplary embodiments of the invention are shown in the drawing in several figures and explained in further detail in the ensuing description. Shown are.

DESCRIPTION OF THE PREFERRED EMBODIMENTS

Figure 1:
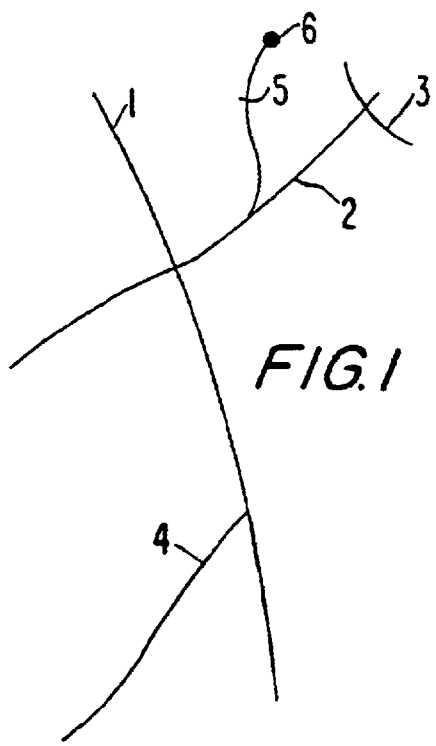
FIG. 1, a detail from a road map.

The detail of a road map shown in FIG. 1 shows an actual situation with a plurality of streets 1, 2, 3, 4. The entrance 5 to a newly built parking garage 6 branches off from the street 2.

Figure 2:
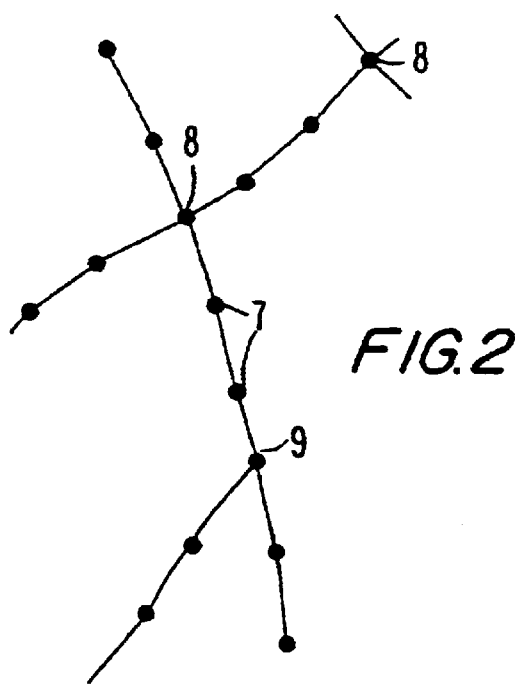
FIG. 2, a detail of a digital road map in the receiver.

The road map of FIG. 2, present in a receiver for decoding location-specific reports, includes the streets and roads in the form of connecting lines between individual locations defined by the coordinates, which can optionally also be names or code numbers; among others, these defined locations are simple points 7 along the way, intersections 8, forks 9, or such other objects as buildings of particular interest.

Figure 3:
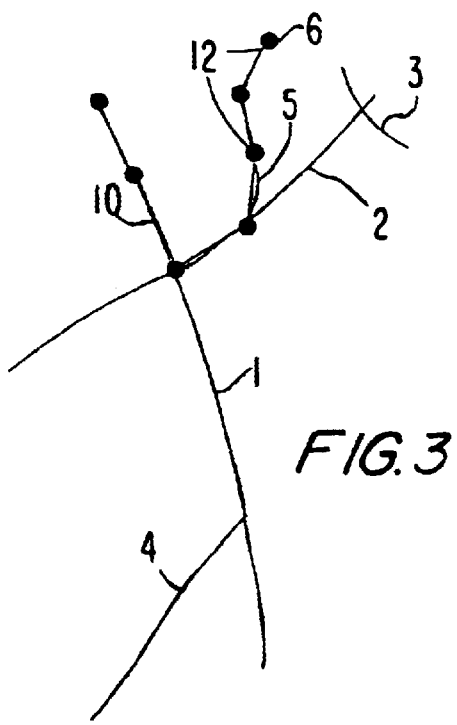
FIG. 3, a coordinate chain generated for encoding according to the invention.
Figure 4:
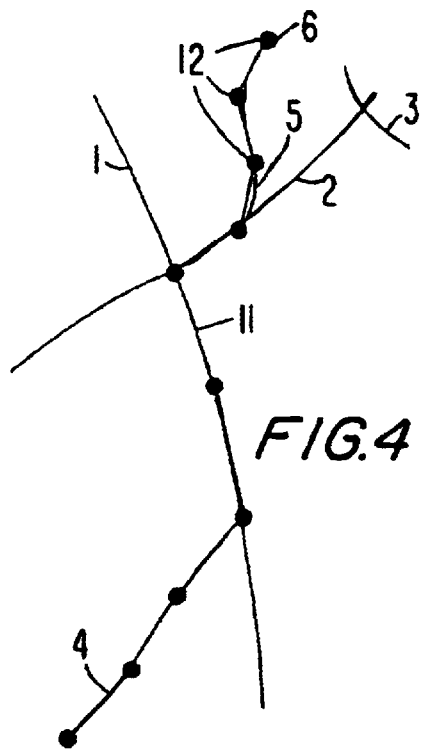
FIG. 4, a further coordinate chain generated for encoding according to the invention.

If a message pertaining to the parking garage 6 (FIG. 1) is to be transmitted by a transmitter, then a receiver equipped with the database of FIG. 2 cannot decode this message; that is, the parking garage cannot be spatially associated with anything. To make it possible to do so by the method of the invention, in the transmitter a coordinate chain 10, 11, shown in FIGS. 3 and 4, that leads to the parking garage 6 is formed.

After the transmission, the coordinate chain with the traffic route network is compared in the database of the receiver (this is known as map matching). A comparison with the entire traffic route network, for instance that of Germany, is not necessary, since it is a precondition that the coordinate indications used in the databases match approximately. By means of the map matching, the coordinates of the points belonging to the coordinate chain are shifted in such a way that those that do have matches with the traffic route network in the receiver come to be located on that traffic route network. The points 12 of the coordinate chain are not located on the traffic route network of the receiver. However, that traffic route network can be expanded, for instance in the database itself or in a special further database intended for expansion.

As already mentioned, in a further feature of the invention, it can be provided that the points of the coordinate chains 10, 11 that can be expected to be located on traffic routes (streets or roads) are emphasized particularly. This makes the search in the receiver database simpler and faster, because a search for whether the points 12 might be located on traffic routes and optionally also have a characteristic property is then unnecessary.

Figure 5:
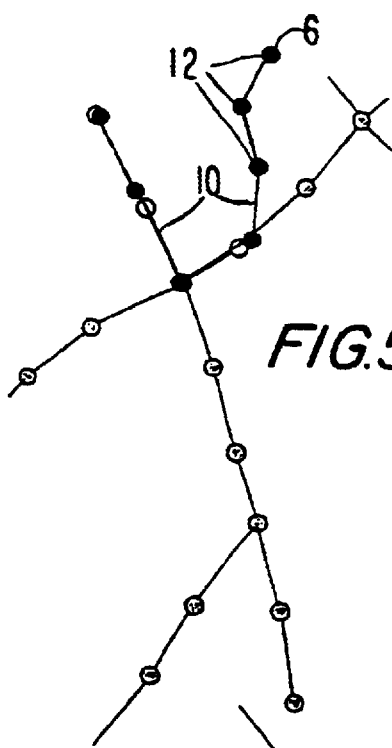
FIG. 5, the coordinate chain of FIG. 3, copied onto the digital road map of FIG. 2.
Figure 6:
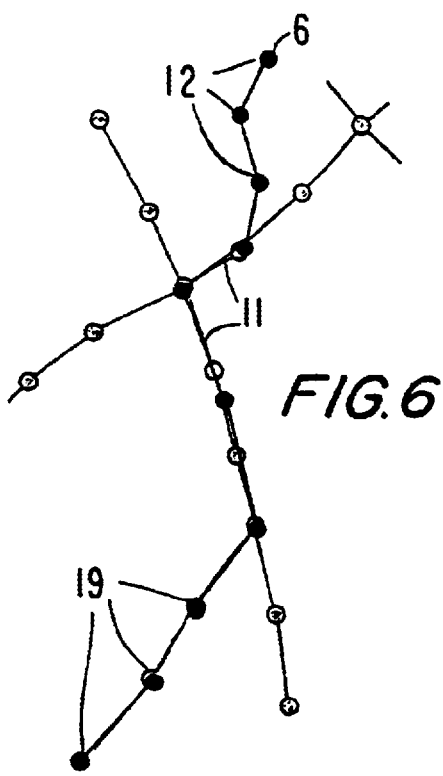
FIG. 6, the coordinate chain of FIG. 4, copied onto the digital road map of FIG. 2.

FIG. 5 and FIG. 6 show the affected parts of the receiver database, with the coordinate chains that have already been made to coincide. In the receiver database, an item of information suitable for navigation is present that indicates where the exit to the parking garage 6 branches off from the street 1, and where the entrance 5 leads to the parking garage 6. For instance, if the street 4 (FIG. 4) is not present in the receiver database, then often it is not expedient to enter the applicable points 19 of the coordinate chain. In the method of the invention, it is therefore preferably provided that only the points 12 adjoining the object 6 and not present in the receiver database be entered in the database.

Figure 7:
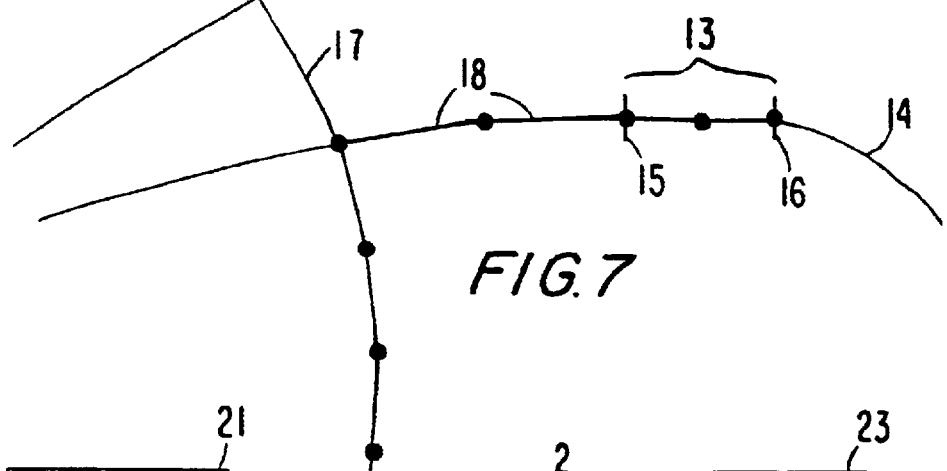
FIG. 7, a further application of the method of the invention, shown schematically.

In the exemplary embodiment shown in FIG. 7, a report of a traffic jam is to be reported, which pertains to a jam 13 on a road 14 that extends from 15 to 16. In the event that the locations 15 and 16 are not in the receiver database, but the road or street 14 and a further road or street 17 are present in that database, in the transmitter a coordinate chain is formed that extends over part of the street 14 and part of the street 17. In the portion of the road network to be considered here, there are no road segments that form such an angle with one another and have approximately the same geographic directions as the streets 14 and 17. The receiver therefore associates the coordinate chain 18, as shown in FIG. 7, with the area of intersection of the streets 14 and 17, and thus the points 15 and 16 are also defined as the beginning and end of the traffic jam and can be decoded.

Figure 8:
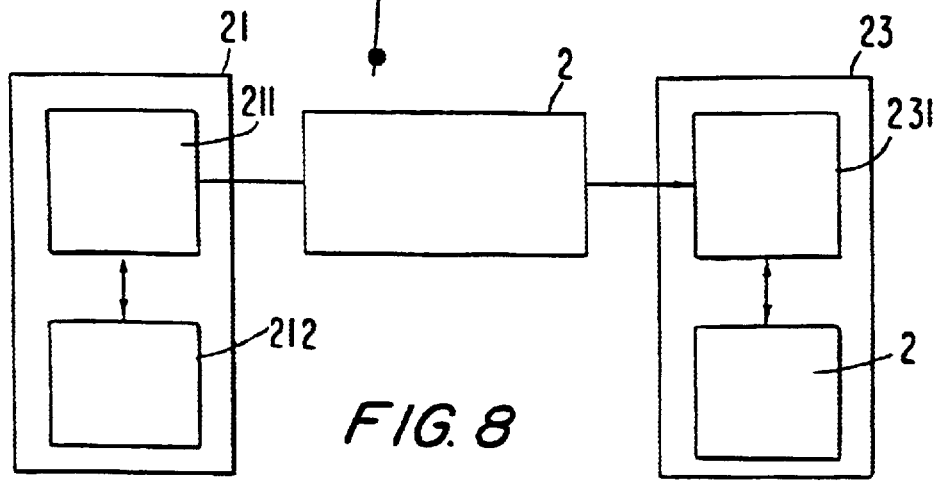
FIG. 8, a block circuit diagram of a device for transmitting information according to the invention.
Figure 9:
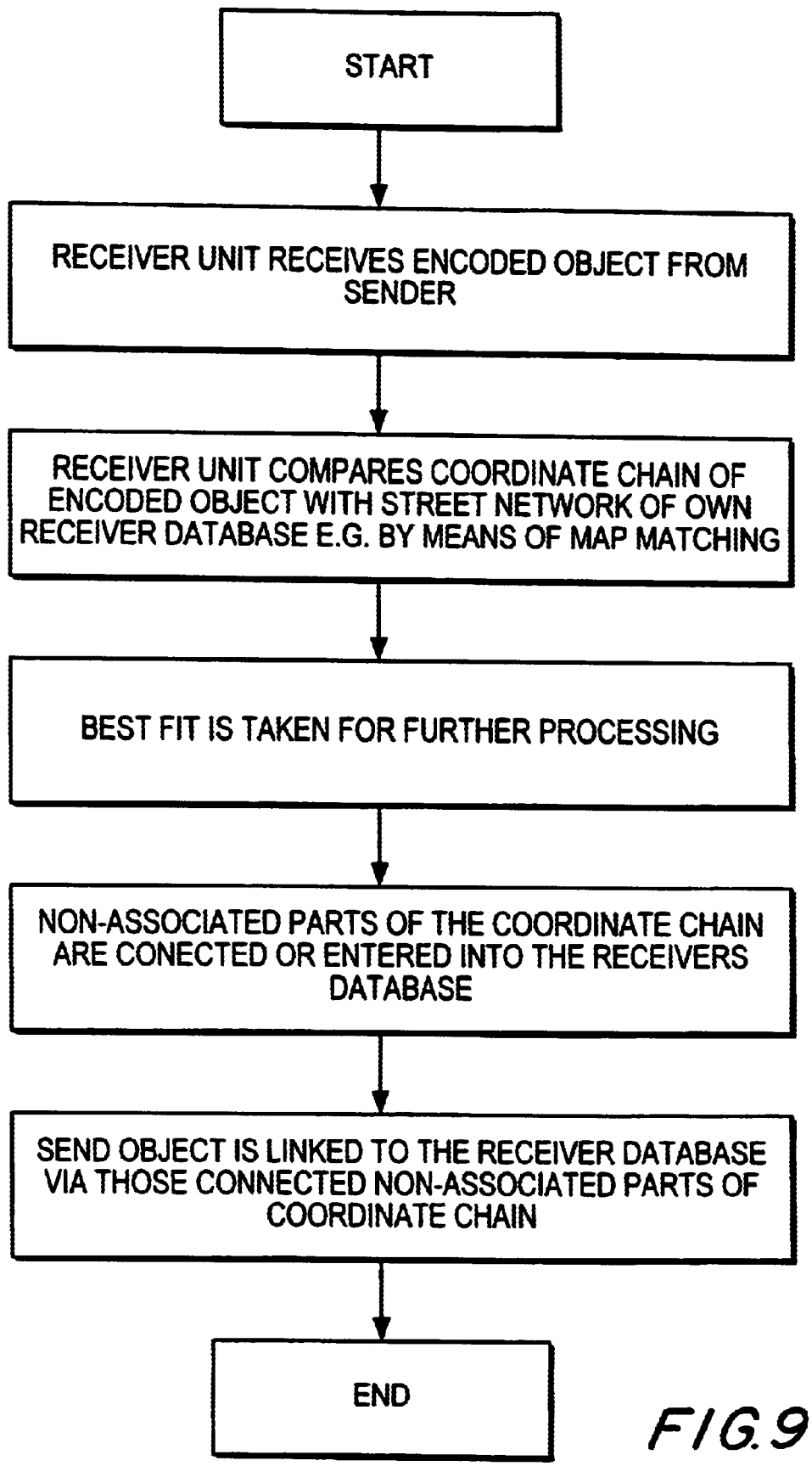
FIG. 9 is a view showing a flowchart of the inventive method.

The device shown in FIG. 8 comprises a transmitter 21, a transmission system 22, and a receiver 23. The object to be transmitted is encoded in an encoder 211 by the method of the invention, in which both the objects 21 themselves and the traffic routes required to derive the coordinate chain are taken from a database 212. The encoder 211 transmits the object and the coordinate chain to the transmission system 22. In the receiver 23, a decoder 231 accepts the object and the coordinate chain. The decoder compares the coordinate chain with the traffic routes in its database 232. If the decoder 231, in its database 232, finds a part of the traffic route network that is quite similar to or the same as the coordinate chain, then the object is decoded or referenced with respect to location.

What is claimed is:

1. A method for encoding objects in a traffic route network, to which information from one transmitter at a time to a receiver is transmitted and for encoding and decoding in different databases formed as digital maps of a traffic route network in the transmitter and receiver, the method comprising the steps of providing objects each with at least one coordinate chain located at least in part on traffic routes that are also included in the database of the receiver; including in the at least one coordinate chain characteristic properties of parts of the traffic route network; and comparing in the database of the receiver transmitted data with data in the database of the receiver to provide in the database of the receiver matching of the transmitted coordinate chain with the traffic route network.

2. A method as defined in claim 1; and further comprising selecting characteristic properties so that they are prominent courses of the routes formed as curves, and prominent sequences of elements selected from the group consisting of intersections, forks, curves and a combination thereof.

3. A method as defined in claim 1; and further comprising selecting the characteristic properties as objects which are stored in memory, referenced identically in each of the databases used.

4. A method as defined in claim 1; and further comprising comparing an ascertained coordinate chain with traffic routes of the database of the transmitter and if ambiguities result, performing at least one step selected from the group consisting of varying the coordinate chain, expanding by additional pairs of coordinates, and both.

5. A method as defined in claim 1; and further comprising identifying those parts of the at least one coordinate chain for which a match with the database of the receiver is to be expected.

6. A method as defined in claim 1; and further comprising, in the case if there are similarities during comparison of the coordinate chain that was received with the object with the database of the receiver, associating the at least one coordinate chain with a similar part of the traffic route network; and connecting in accordance with a geometrical location of the associated part non-associated parts of the at least one coordinate chain to the traffic routes of the receiver database.

7. A method as defined in claim 6; and further comprising entering into the database of the receiver the transmitted objects and the parts, adjacent to the object, of the at least one coordinate chain that are not located in the traffic route network stored in the memory in the database of the receiver.

8. A method as defined in claim 7; and further comprising entering into a further database of the receiver the transmitted object and the parts, adjacent to the object, of the at least one coordinate chain that are not located in the traffic route network stored in memory in the database of the receiver.

9. A method as defined in claim 6; and further comprising employing for comparison, methods of pattern recognition formed as map matching.

10. A method as defined in claim 1; and further comprising using the coordinate chain which, in addition to coordinates of flat ground, also has altitude coordinates.

* * * * *